W. J. REHRIG.
APPARATUS FOR MAKING WOOD SEPARATORS FOR STORAGE BATTERIES, &c.
APPLICATION FILED MAY 19, 1919.
1,342,925.
Patented June 8, 1920.
3 SHEETS—SHEET 1.
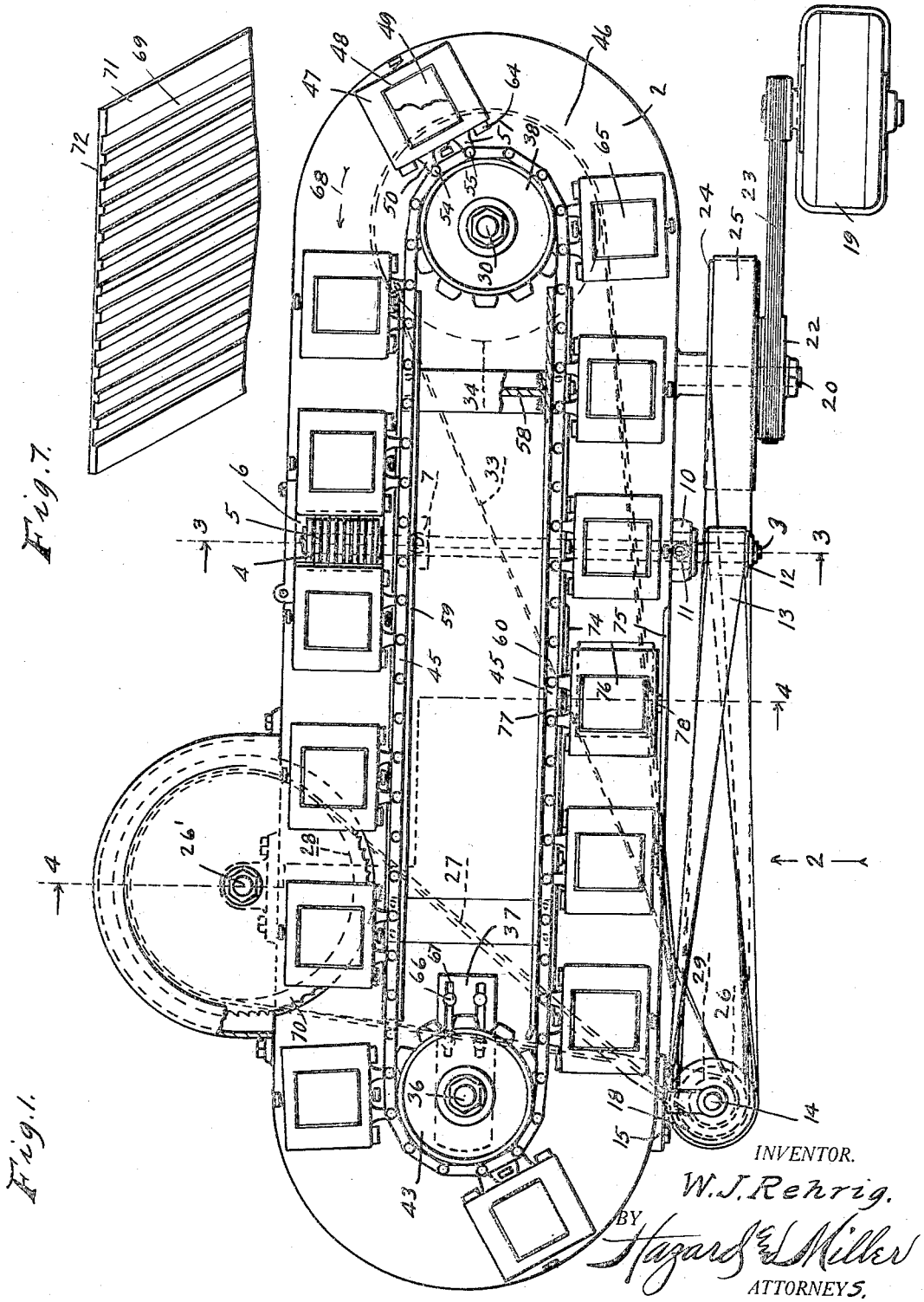
INVENTOR.
W. J. Rehrig.
BY
Hazard & L. Miller
ATTORNEYS.

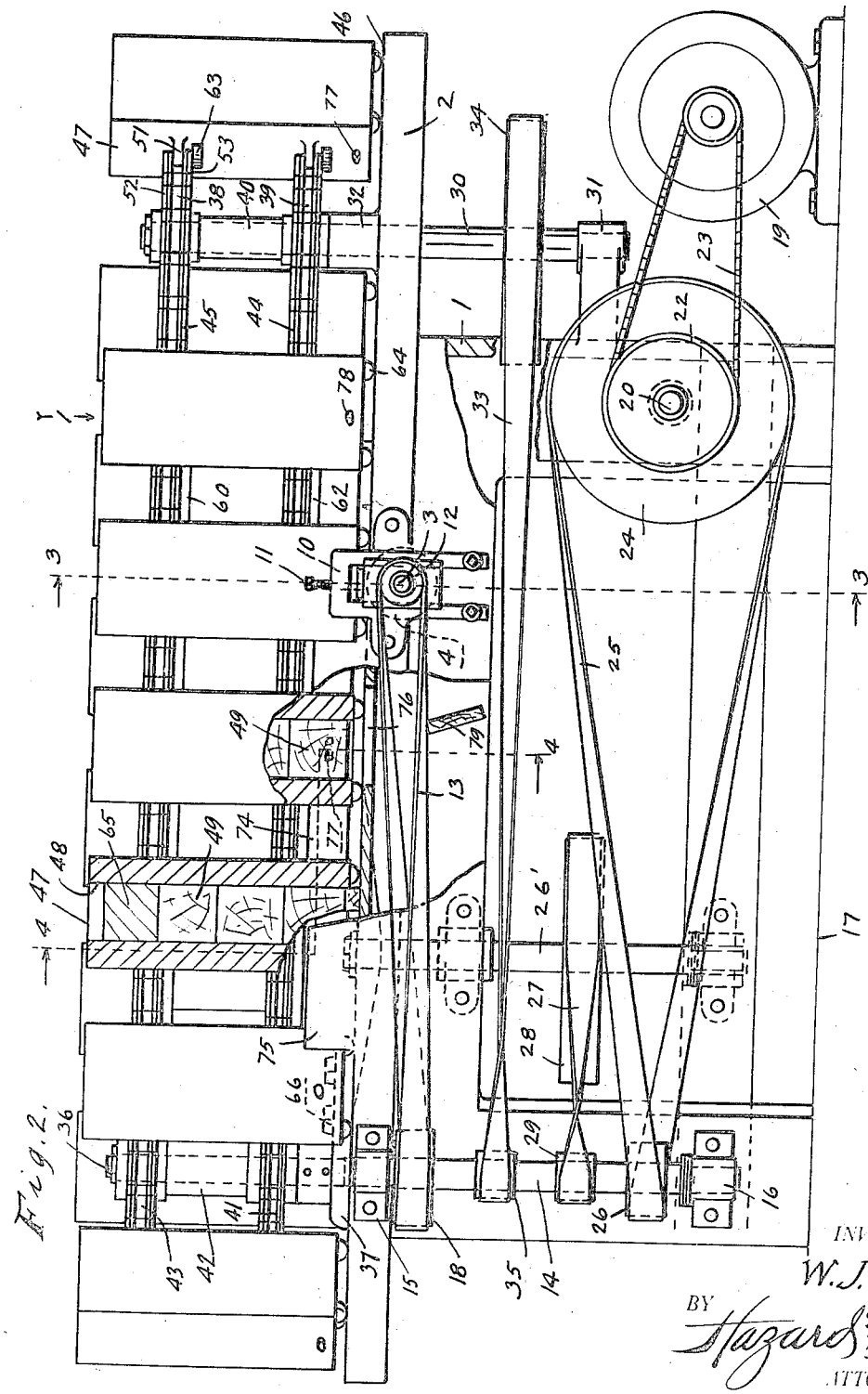

W. J. REHRIG.
APPARATUS FOR MAKING WOOD SEPARATORS FOR STORAGE BATTERIES, &c.
APPLICATION FILED MAY 19, 1919.
1,342,925.
Patented June 8, 1920.
3 SHEETS—SHEET 3.
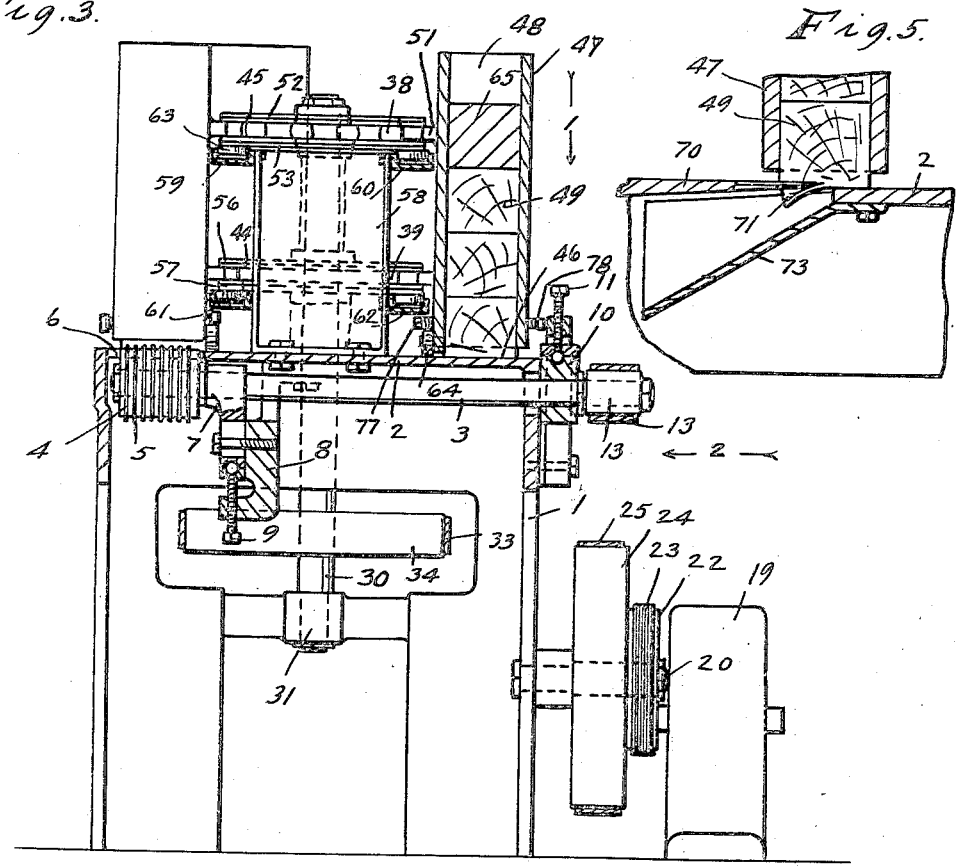
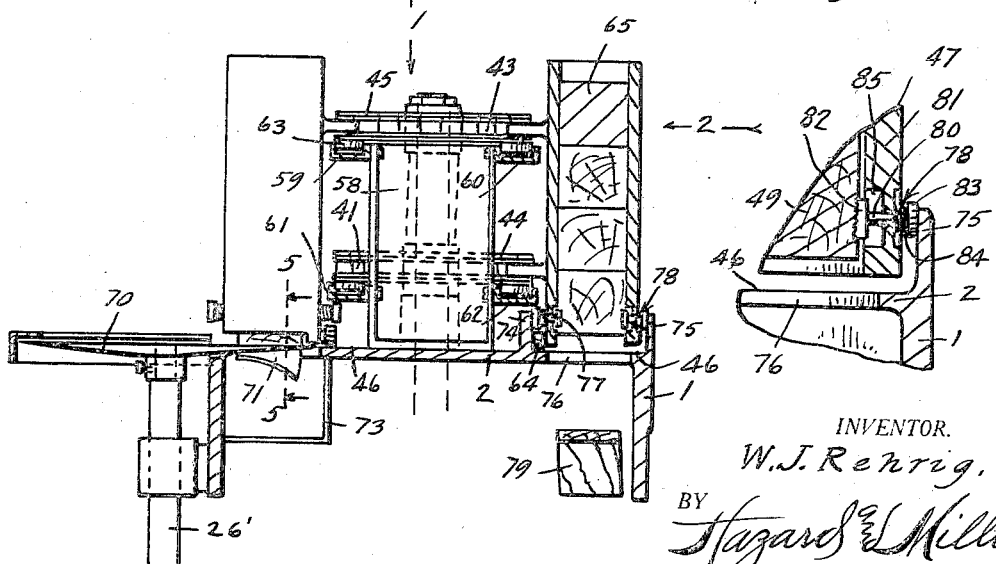
INVENTOR.
W. J. Rehrig,
BY
Hazard & Miller
ATTORNEYS.

UNITED STATES PATENT OFFICE.

WILLIAM J. REHRIG, OF LOS ANGELES, CALIFORNIA.

APPARATUS FOR MAKING WOOD SEPARATORS FOR STORAGE BATTERIES, &c.

1,342,925.  Specification of Letters Patent.  Patented June 8, 1920.

Application filed May 19, 1919. Serial No. 298,304.

*To all whom it may concern:*

Be it known that I, WILLIAM J. REHRIG, a citizen of the United States, residing at Los Angeles, in the county of Los Angeles and State of California, have invented new and useful Improvements in Apparatus for Making Wood Separators for Storage Batteries, &c., of which the following is a specification.

My object is to make a groover and slicer for producing separators for the elements of storage batteries and for like purposes, and my invention consists of the novel features herein shown, described and claimed.

Figure 1 is a top plan view of a grooving and slicing machine embodying the principles of my invention, the view being taken looking in the direction indicated by the arrows 1 in Figs. 2, 3 and 4.

Fig. 2 is a side elevation looking in the direction indicated by the arrows 2 in Figs. 1, 3 and 4, parts being broken away and shown in section.

Fig. 3 is a vertical cross section on the lines 3—3 of Figs. 1 and 2.

Fig. 4 is a fragmentary vertical cross section on the lines 4—4 of Figs. 1 and 2.

Fig. 5 is a fragmentary vertical sectional detail on the line 5—5 of Fig. 4.

Fig. 6 is an enlarged fragmentary vertical sectional detail on the same plane as Fig. 4.

Fig. 7 is a fragmentary bottom perspective of the product of the machine, said product being adapted especially for use as separators for the elements of storage batteries.

The main frame 1 supports a flat level table 2, the groover shaft 3 is mounted crosswise of the machine below the table 2 and the groover 4 is fixed upon the back end of the groover shaft 3, the cutting edges 5 of the groover projecting through a slot 6 in the table 2 just enough to make grooves of the desired depth, and the depth of the grooves is adjusted by mounting the shaft 3 in a bearing 7 and connecting the bearing 7 to a bracket 8 and placing an adjusting screw 9 through the bracket 8 to raise and lower the bearing 7, thereby raising or lowering the end of the shaft 3 to raise or lower the groover 4. The forward end of the shaft 3 is mounted in a bearing 10, said bearing 10 being adjusted by a screw 11.

The groover shaft 3 has a driving pulley 12 driven by a belt 13. The countershaft 14 is mounted vertically in bearings 15 and 16 projecting outwardly from the frame 1. The frame 1 rests upon the foundation 17. The belt 13 runs over a pulley 18 upon the countershaft 14. A motor 19 is mounted upon the foundation 17. The stub shaft 20 extends outwardly from the frame 1, the chain wheel 22 is rotatably mounted upon the stub shaft 20 and connected to the motor 19 by a chain 23, the belt pulley 24 is mounted upon the stub shaft 20 and connected to the chain wheel 22, and a belt 25 runs over the belt wheel 24 and over the pulley 26 upon the countershaft 14 so as to drive the countershaft. A cutter shaft 26' is mounted vertically and parallel with the countershaft 14, and a belt 27 runs upon a large pulley 28 upon the cutter shaft 26' and upon a small pulley 29 upon the countershaft 14.

The block moving shaft 30 is mounted vertically near one end of the table 2 and extends downwardly into a bearing 31 and upwardly through a bearing 32, and a belt 33 runs over a pulley 34 upon the shaft 30 and over a pulley 35 upon the countershaft 14. The belt 25 is twisted a quarter turn to transmit power from the horizontal axis of the shaft 20 to the vertical axis of the countershaft 14. The belt 27 is crossed to run the cutter shaft 26' in the opposite direction from the countershaft 14. The belt 13 is twisted a quarter turn to transmit power from the vertical countershaft to the horizontal groover shaft 3, and the belt 33 is crossed to run the shaft 30 in the opposite direction from the countershaft 14.

An idler shaft 36 is rigidly mounted in a base 37 fixed upon the table 2 in position parallel with the block moving shaft 30. Driving sprockets 38 and 39 are fixed upon the shaft 30, the sprocket 39 resting upon the bearing 32, and there being a spacing sleeve 40 resting upon the hub of the sprocket 39 to support the sprocket 38. In a like manner an idler sprocket 41 runs loosely upon the idler shaft 36 and rests upon the base 37, a sleeve 42 rests upon the idler sprocket 41, and an idler sprocket 43 rests upon the sleeve 42. The idler sprocket 41 is in line with the driving sprocket 39 and the idler sprocket 43 is in line with the driving sprocket 38. A sprocket chain 44 runs around the sprockets 39 and 41, and a second sprocket chain 45 runs around the sprockets 38 and 43.

The table 2 forms a track 46 around the chains 44 and 45 and the opening 6 through which the groover 4 projects is crosswise of this track. A plurality of block magazines 47 are mounted to run upon the track 46, each of said magazines having a vertical rectangular opening 48 extending from top to bottom and adapted to receive the wooden blocks 49 one on top of the other. Normally the lower faces of the lower blocks run upon the track 46. Each magazine 47 is connected to the chains 44 and 45 by ears 50 and 51 incorporated into the joints of the chains.

Referring to Fig. 3, the chain 45 consists of an upper line of links 52 and a lower line of links 53, and the ears 50 and 51 are placed between the lines of links 52 and 53, and the link pins 54 and 55 are inserted through the joints of the line of links 52 through the ears 50 and 51 and through the line of links 53. In a like manner, the chain 44 consists of the upper line of links 56 and the lower line of links 57 and the ears are inserted between the lines of links and the pins inserted through the links and ears.

A guide supporting frame 58 is fixed upon the table 2 and upper guide bars 59 and 60 and lower guide bars 61 and 62 are rigidly mounted upon this frame. Rollers 63 are mounted upon the lower ends of the pins 54 and 55 to run in the guide bars 59, 60, 61 and 62, said guide bars being channel-shaped, and the rollers being adapted to run against the side flanges of the channels. Rollers 64 are mounted upon the magazines 47 at their inner sides to run upon the table 2. Weights 65 are placed in the magazines 47 on top of the blocks 49 to press the blocks downwardly against the face of the table. The base 37 is mounted and fixed upon the table 2 by bolts 66 extending through slots 67, so that the base may be adjusted upon the table to tighten the chains 44 and 45.

As the machine operates to move the magazines 47 in the direction indicated by the arrows 68 with the blocks 49 bearing upon the face of the track 46, the lower face of the block will contact with the groover 4 and grooves 69 will be formed. The cutter 70 is a circular saw, with knife edges, the saw being beveled from a comparatively thick body to a thin edge, and the upper face of the saw being straight and the saw is set slightly above the upper face of the table 2, so that when the block passes the saw a slice 71 is cut from the block, said slice 71 having a smooth upper face 72 and the grooves 69 in its lower face, and said slices being adapted for use as separators between the elements of storage batteries.

As the magazines travel around and around the blocks 49 are cut away into slices and the slices fall downwardly into the box or chute 73 from which they may be removed as desired.

Referring to Figs. 1 and 4, clutch operating bars 74 and 75 extend upwardly from the table 2 at the sides of the track 46, there being an opening 76 through the table 2 centrally located relative to the clutch operating bars 74 and 75. Clutches 77 and 78 are mounted in each magazine to be operated by the clutch operating bars 74 and 75 to grip the blocks 49 and carry the blocks over the opening 76, and when the block has been cut down to a thin piece as 79 so that the clutches 77 and 78 will grip the next block above the slice 79 and not grip the slice 79, then the slice 79 will fall through the opening 76 and after the magazines pass the bars 74 and 75 the clutches 77 and 78 will release and allow the blocks to drop to the face of the table.

Referring to Fig. 6, the clutch 78 consists of a shaft 80 slidingly mounted through the wall 81 of the magazine and having a clutching button 82 upon its inner end, an operating button 83 upon its outer end, and an expansive coil spring 84 around the shaft 80 against the outer face of the wall 81 and against the button 83, the tension of the spring being exerted to throw the button 82 into the recess 85 out of engagement with the block 49, and so that when the button 83 engages the bar 75 the button 83 will be pressed inwardly to press the button 82 against the block 49. The clutch 77 is constructed in the same way to be operated by the bar 74.

When the blocks in the magazine have been exhausted the weight 65 is removed and a new stock of blocks placed in the magazine.

The machine will operate at a comparatively high rate of speed and will produce the storage battery separators at a high rate of speed.

While the magazines 47 run upon the rollers 64 at their inner sides the magazines are held upright by the connections to the chains 44 and 45, and the rollers 64 being upon the inner sides of the magazines are out of the way of the groover 4 and the cutter 70.

Various changes may be made without departing from the spirit of my invention as claimed.

I claim:

1. A groover and slicer for producing separators for the elements of storage batteries and the like comprising an endless track, magazines mounted to travel above the track, said magazines being open at the top and bottom and adapted to receive blocks with the blocks bearing upon the track and feeding downwardly, a groover in the track to groove the lower faces of the blocks as they pass over the groover, and a slicer in the track to cut slices from the blocks after they pass the groover and means for advancing the magazines along the track over the groover in a straight line of travel.

2. A groover and slicer for producing separators for the elements of storage batteries and the like comprising an endless track, magazines mounted to travel above the track, said magazines being open at the top and bottom and adapted to receive blocks with the blocks bearing upon the track and feeding downwardly, a groover in the track to groove the lower faces of the blocks as they pass over the groover, a slicer in the track to cut slices from the blocks after they pass the groover, there being a discharge opening through the track, and means for carrying the blocks over the discharge opening until the lower block is too thin for use and then allowing the thin block to drop through the opening and means for advancing the magazines along the track over the groover in a straight line of travel.

3. A groover and slicer for producing separators for the elements of storage batteries and the like, in combination, an endless track elliptical in the form having a flat level face, magazines mounted to travel above the track adapted to receive blocks and feed the blocks downwardly to the track, sprocket chains carried upon sprocket wheels adapted to carry the magazines over the track, a groover mounted cross-wise of a straight side portion of the track, a slicer mounted cross-wise of the track behind the groover, means for carrying the blocks over a discharge opening in the track until the blocks are too thin for use and so that the thin blocks will be caused to drop through the discharge opening.

4. In a groover and slicer for producing separators for the elements of storage batteries and the like, in combination, an endless track having a flat level face, magazines mounted to travel above the track adapted to receive blocks and feed the blocks downwardly to the track, means for carrying the magazines around over the track, a groover mounted crosswise of the track, a slicer mounted crosswise of the track behind the groover, and means for carrying the blocks over a discharge opening in the track until the blocks are too thin for use and so that the thin blocks will be caused to drop through the discharge opening.

In testimony whereof I have signed my name to this specification.

WM. J. REHRIG.